Dec. 31, 1963 R. A. WOLFF 3,116,372

F.M. STEREO INDICATOR

Filed July 5, 1962

INVENTOR.
Robert A. Wolff
BY James T. Barr
ATTY.

United States Patent Office 3,116,372
Patented Dec. 31, 1963

3,116,372
F.M. STEREO INDICATOR

Robert A. Wolff, Lombard, Ill., assignor to Admiral Corporation, Chicago, Ill., a corporation of Delaware Filed July 5, 1962, Ser. No. 207,663
5 Claims. (Cl. 179—15)

This invention relates in general to frequency modulation stereo demultiplexing equipment and in particular to means in such equipment for readily indicating when a frequency modulated stereo signal is being received.

Recently the Federal Communications Commission adopted certain standards for F.M. stereo broadcasting. According to these standards, the composite stereo signal transmitted by the station comprises a left channel plus right channel (L+R) audio summation signal, a left channel minus right channel (L−R) amplitude modulated audio difference signal and a continuous wave pilot signal. Assuming for the moment that a non-recorded musical program was to be broadcast, a left channel microphone (or combination of microphones) and a right channel microphone (or combination of microphones) would be placed in appropriate positions before the orchestra. The L+R signal is obtained by adding the output signal of the L and R microphones, and the L−R signal by subtracting these output signals.

The L+R signal then amplitude modulates a 38 kilocycle per second carrier wave which is thereafter suppressed, leaving only the sideband information. While the term "carrier wave" is applied in this description to the 38 kilocycle per second signal, it should be realized that it is in fact a subcarrier with respect to the main station carrier wave. To allow the 38 kc. carrier to be reproduced or regenerated in the receiving equipment, a pilot signal, of accurately controlled phase and frequency, is also developed. The L+R audio information, the L−R sideband information and the pilot signal are then combined, and this combined signal is used as the modulating signal for frequency modulating the high frequency broadcast carrier of the transmitting station. According to the FCC standards, the frequency of the pilot signal must be one-half the frequency of the 38 kc. subcarrier, or 19 kc., and have a predetermined amplitude.

Various literature in the art has shown that the composite stereo signal may be constructed in different manners. One such technique involves time division multiplex in which the left and right channel information is alternately sampled at a 38 kilocycle per second sampling rate.

Similarly, there are numerous methods for decoding or demultiplexing the composite stereo signal to obtain separate left and right channel signals in the receiving equipment. The circuit to be described illustrates one such method, which will be termed envelope detection. This method may be understood most readily by viewing it as the converse of the time division multiplex technique. For a complete analysis of the waveforms and techniques employed in an envelope detection system, see the copending application of Leonard Dietch, Serial Number 194,601, filed May 14, 1962.

The envelope detection method utilizes the fact that the composite stereo signal, after detection in conventional F.M. receiving equipment, comprises a pure L signal which is interleaved with a pure R signal. The respective R and L envelopes are defined by alternate sets of peaks of the 38 kc. carrier, which may be considered as the sampling wave in the time division multiplex system. By appropriate reinsertion of the 38 kc. carrier, the L signal envelope and the R signal envelope may be instantaneously separated from each other and individually detected by simple diode rectifier networks. This eliminates the need for separate detection of the L+R and L−R signals and the matrix circuitry required to obtain the pure R signal and the pure L signal.

One of the incidental problems of compatible monaural-stereophonic F.M broadcasting is that posed to the listener in determining whether a monaural or stereophonic program is being received. This determination is difficult where the stereo program material does not exhibit a great deal of difference between the left and right channel information. This is especially true in the case of classical music in which protracted and attentive listening may be required to perceive the small differences between the left channel output and the right channel output. Even with program material having a great degree of stereophonic effect, it is usually necessary for the listener to step back and listen for a certain amount of time to ascertain whether the material is monaural or stereophonic.

The invention provides simple means for visually indicating to the listener when an F.M. stereo broadcast is being received. The visual indicating means used in the circuits to be described is a small incandescent lamp, having a predetermined thermal delay characteristic, which is lighted responsive to the presence of the continuous 19 kc. pilot but not responsive to spurious short duration noise signals.

Accordingly, a principal object of this invention is to provide a reliable indicating device for visually indicating receipt of stereophonic transmissions from an F.M. broadcasting station.

A further object of this invention is to provide an indicating device, having a predetermined thermal delay characteristic, operable responsive to an F.M. pilot signal of relatively long duration but not operative responsive to spurious noise signals of relatively short duration.

Another object of this invention is to provide a transistor operated indicating device for indicating F.M. stereo multiplex broadcasts, which device may readily be adapted for use with F.M. multiplex detectors of either the transistor or the tube type.

A still further object of this invention is to provide a stereophonic demultiplexing unit with an economical indicating light for determining the presence of stereophonic broadcasts.

Further objects and advantages of this invention will be apparent upon reading the following specification in conjunction with the drawing in which.

Figure 1:
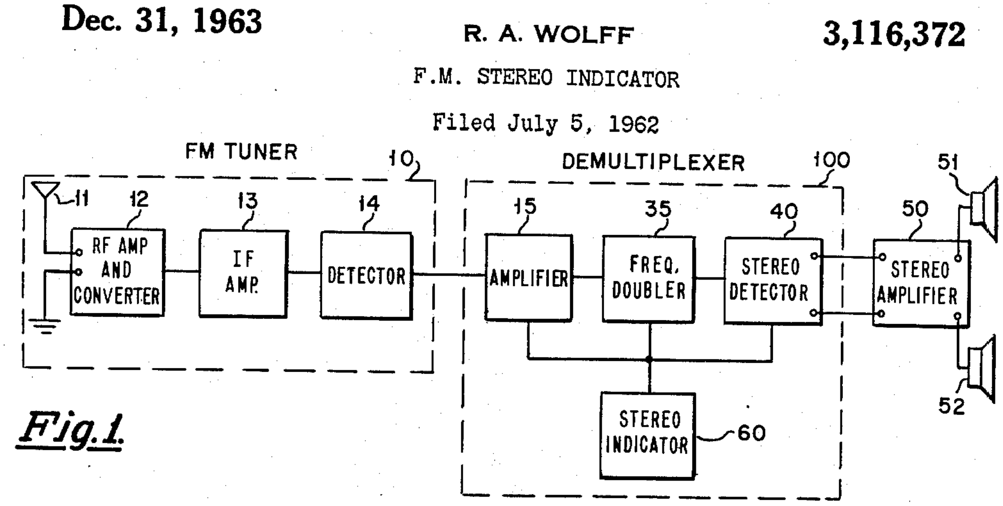
FIG. 1 depicts in block form a receiving system capable of receiving and decoding an F.M. stereo signal.

Referring now to FIG. 1, a block diagram of an F.M. tuner is shown in dashed line box 10. An antenna 11 couples a receiving broadcast signal from an F.M. transmitting station to radio frequency amplifier and converter 12 where, in a well known manner, the selected station carrier is heterodyned with a locally generated signal to produce an intermediate frequency signal. The resultant signal is amplified by intermediate frequency amplifier 13 and detected by detector 14. The F.M. tuner is in all respects conventional and, responsive to receipt of a monaural transmission, the output of detector 14 produces an audio frequency monaural signal. Responsive to receipt of an F.M. stereophonic signal, the output of detector 14 produces an audio summation signal, sidebands of an audio difference signal and a pilot signal.

A block diagram of a demultiplexer unit is shown in dashed line box 100. The output of detector 14 is coupled to an amplifier 15 which includes circuitry for separating the pilot signal. The pilot signal is coupled to a frequency doubler 35 which reproduces the original 38 kc. subcarrier. Both amplifier 15 and doubler 35 feed stereo detector 40 in which the regenerated 38 kc. wave is combined with the audio L+R signal and the sidebands of the L−R signal. Stereo detector 40 has two outputs, one of which develops a pure R signal and the other of which develops a pure L signal. These signals are coupled to stereo amplifier 50 where they are amplified in a well known manner and drive a pair of stereo speakers 51 and 52 to reproduce the R and L signals in acoustical form. Frequency doubler 35 is also coupled to stereo indicator circuit 60 which yields a visual indication of the presence of the 19 kc. pilot.

Figure 2:
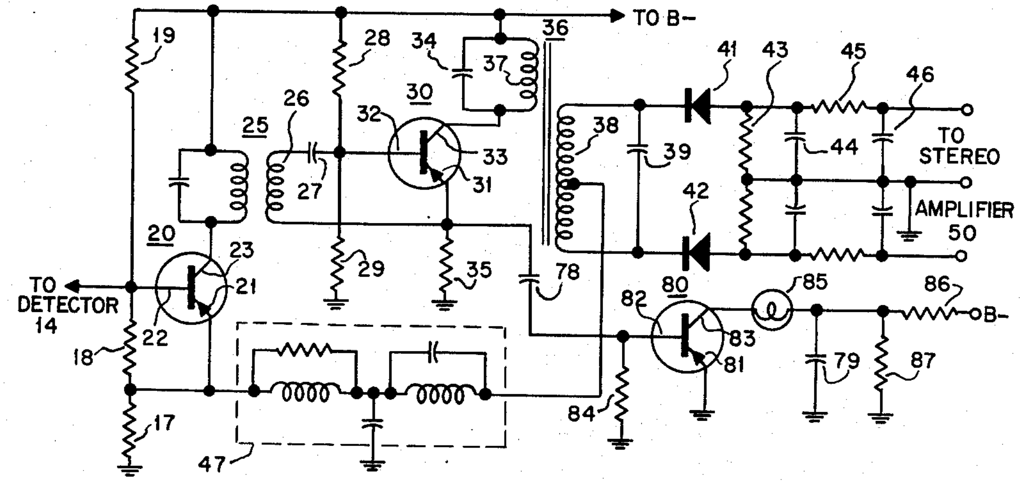
FIG. 2 represents a schematic diagram of the demultiplexer unit of FIG. 1.

In FIG. 2 the circuitry included in demultiplexer 100 is shown in detail. A transistor 20 having an emitter 21, a base 22 and a collector 23 is arranged as an amplifier for the composite stereo signal from detector 14. Collector 23 has a tuned load circuit 25 which is tuned to the frequency of the pilot in the composite stereo signal. Serially connected resistors 17, 18 and 19 are connected between B− and ground and provide proper bias for transistor 20. Since tuned circuit 25 is tuned to the frequency of the pilot, the audio summation and the sideband information signals do not develop appreciable voltages therein. With respect to these latter signals, transistor 20 acts as an emitter follower, and the audio summation signal and the sideband information signal appear across resistor 17.

Winding 26 is coupled to tuned circuit 25 and impresses a voltage, through a capacitor 27, between emitter 31 and base 32 of transistor 30. Resistors 28 and 29 bias transistor 30 so that it is operating on the nonlinear portion of its operating characteristic. Consequently, the 19 kc. pilot signal generates numerous harmonics in the collector load circuit of transistor 30. Collector 33 is connected through the parallel combination of a capacitor 34 and the primary winding 37 of a transformer 36 to a source of B− potential. Winding 37 and capacitor 34 are tuned to 38 kc. and select the second harmonic of the pilot frequency.

Transformer 36 has a center tapped secondary winding 38 with a capacitor 39 coupled thereacross. Secondary winding 38 and capacitor 39 are also tuned to 38 kc. The center tap of winding 38 is connected through a filter and sideband peaking network 47 to emitter 21 of transistor 20. The filter traps out any FCC subsidiary communication authorization (SCA) transmissions to prevent interference therefrom. Thus, the secondary 38 of transformer 36 has three signals applied to it, the first being the developed 38 kc. carrier wave, the second being the audio summation component (L+R) and the third being the audio difference sideband information (L−R). It should also be noted that the 19 kc. pilot may be trapped in the filter and peaking network 47, if desired.

A pair of diodes 41 and 42 and their respective load circuits are individually coupled to opposite ends of winding 38. The load for diode 41 comprises resistor 43 and bypass capacitor 44. The reintroduced 38 kc. carrier wave may be considered as a switch for alternating turning on diodes 41 and 42. Another way of looking at the operation of this circuit is that the pure R signal envelope is separated from the pure L signal envelope by the introduction of the 38 kc. carrier wave, and these envelopes are separately detected by diodes 41 and 42. Thus a pure R signal, for example, is developed across load resistor 43 and appears at the input of stereo amplifier 50, and a pure L signal is developed across the load resistor of diode 42 and appears at the corresponding input to stereo amplifier 50. Resistor 45 and capacitor 46 provide deemphasis to the detected signal in a well known manner.

An additional transistor 80 having an emitter 81, a base 82 and a collector 83 is provided for energizing incandescent indicator lamp 85 in the presence of the 19 kc. pilot. Base 82 of transistor 80 is connected through a resistor 84 to ground, and through a capacitor 85 to the junction of emitter 31 of transistor 30 and emitter resistor 35. Emitter 81 of transistor 80 is connected to ground and collector 83 is connected to incandescent indicator lamp 85. A voltage divider arrangement, comprising resistors 86 and 87, is connected between B− and ground and has its junction connected to the other end of indicator lamp 85. A capacitor 79 is coupled across resistor 87 and provides a bypass across the voltage divider source for the high frequency currents flowing in the collector-emitter circuit of transistor 80.

Transistor 80 is normally nonconductive until transistor 30 receives a pilot signal. Transistor 30 is maintained conductive direct current-wise by the biasing arrangement employed and amplifies any pilot signal received. However, spurious signals in the vicinity of the frequency of the pilot signal may also be amplified. As mentioned previously, transistor 30 operates as a frequency doubler whereby both the 19 kc. pilot signal and harmonics of the 19 kc. pilot signal flow in emitter resistor 35. The alternating current voltage developed across emitter resistor 35 is coupled to the base of transistor 80 and drives transistor 80 into conduction during the negative half-cycles thereof. It will be noted that indicator lamp 85 comprises the load for transistor 80, and further, that this load is unbypassed. Thus, responsive to conduction in transistor 80, a direct component of load current and alternating components of load current corresponding to the frequency of the pilot signal and its harmonics, flow through indicator lamp 85. The alternating components of load current contribute materially to the brightness indication yielded by indicator lamp 85.

Incandescent indicator lamp 85 has a thermal delay characteristic which effectively prevents its yielding a visual indication of short duration signals. This feature is extremely important to preclude false indications of stereophonic transmissions being given to the listener. These false indications may be due to spurious noise signals being generated internally or picked up by the receiving system. An abundance of spurious noise signals is also encountered between station tuning positions of the F.M. tuner, since in these positions there is no noise limiting action. Without the thermal delay characteristic of indicator lamp 85, the listener might receive a number of false indications of stereophonic broadcasts in tuning across the F.M. band.

Figure 3:
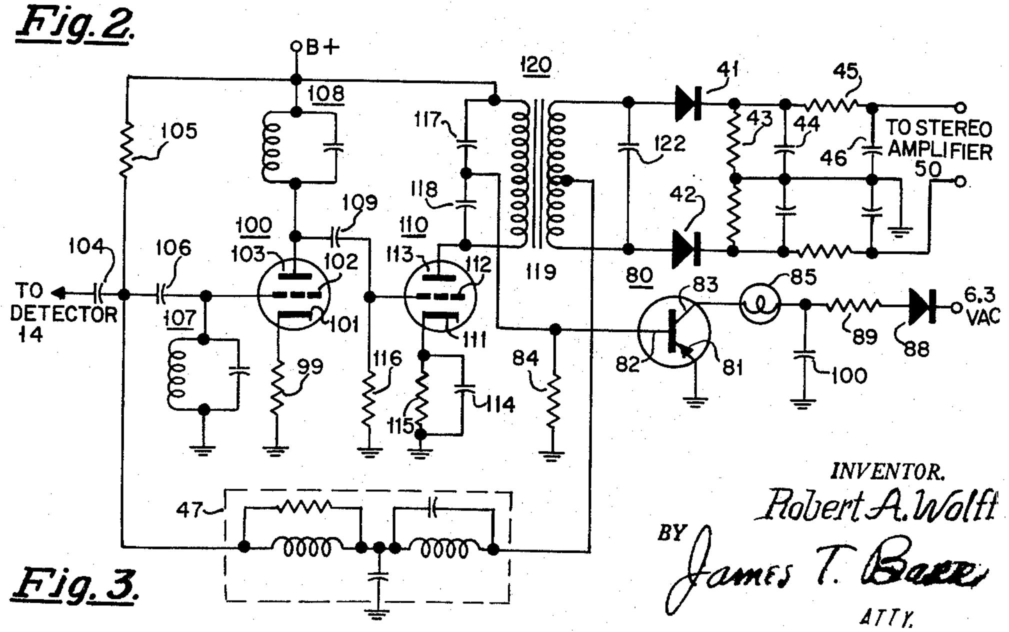
FIG. 3 is a schematic diagram of a tube type version of the demultiplexer unit of FIG. 1.

Referring to FIG. 3, there is shown a vacuum tube version of stereophonic demultiplexer 100 in conjunction with visual indicator 85 and transistor 80. The composite stereo signal is received from detector 14 and coupled through capacitor 104 to the junction of resistor 105, capacitor 106, and filter and peaking network 47. The signal is coupled through capacitor 106 to a tuned circuit 107 and to the control grid 102 of a vacuum tube 100. Tuned circuit 107 is tuned to the frequency of the pilot signal, and vacuum tube 100 is operated as a tuned amplifier for the pilot signal frequency. Anode 103 of vacuum tube 100 is coupled to a source of B+ potential through a load circuit 108 which is also tuned to the frequency of the pilot signal. Cathode 101 of vacuum tube 100 is coupled through a cathode resistor 99 to ground. The signal appearing across load circuit 108 is coupled through a capacitor 109 to the grid 112 of vacuum tube 110. Tube 110 has a cathode 111 which is connected, through a bias network comprising resistor 115 and capacitor 114, to ground and an anode 113 connected to a source of B+ potential through the primary winding 119 of a tuned transformer 120. Grid 112 is connected through grid resistor 116 to ground, and tube 110 is operated as an overdriven amplifier. Consequently, tube 110 develops numerous harmonics of the pilot signal. Its load circuit is tuned to 38 kc. and responds substantially only to load currents corresponding to this frequency and harmonics thereof.

A center tapped secondary winding 121 is provided on transformer 120, which is tuned to 38 kc. by capacitor 122 connected thereacross. The diode detectors 41 and 42 and their respective load circuits and deemphasis networks function in the same manner as described with reference to FIG. 2 to separately detect the L and R signals. It will be noted that, by virtue of the connection of resistor 105 to B+ and to filter and peaking network 47, a forward bias is applied to diodes 41 and 42. The bias potential is applied through the coils of network 47 to the center tap of winding 121. This connection enables the demultiplexer to function properly on monaural as well as stereophonic signals without necessitating additional switching.

A low impedance tap is provided by capacitors 117 and 118 (connected across winding 119) for supplying the 38 kc. signal to the base 82 of transistor 80. Operation of transistor 80 is the same as described in FIG. 2. The power supply for transistor 80 comprises a 6.3 volt A.C. potential source, a rectifier 88, a resistor 89 and a filter capacitor 100. The 6.3 volt A.C. potential is readily available in a circuit of this type, since it corresponds to the heater voltage commonly employed for vacuum tubes.

Again, as in FIG. 2, indicator lamp 85 has a predetermined thermal delay characteristic for preventing visual indications responsive to spurious noise signals of short duration. It is also unbypassed so that the 38 kc. components of load current (and harmonics thereof) flow therethrough. Thus, in all essentials, except for the low impedance tap coupling transistor 80 to the load circuit of tube 110, the indicating circuit of FIG. 3 operates in the same manner as the indicating circuit of FIG. 2.

What has been described is a reliable, economical visual indicator circuit for an F.M. stereophonic demultiplexer unit which yields a visual indication of the presence of F.M. stereo transmissions. The unit is not only economical and reliable but is also readily adaptable for use with demultiplexers of either the vacuum tube or the transistor type. It is understood that numerous modifications and departures from the circuits shown, which depict the preferred embodiments of the invention, may be made without departing from the true spirit and scope thereof as defined in the claims.

The embodiments of the invention in which an exclusive property or privilege is claimed are defined as follows:

1. In combination; signal translation means translating frequency modulated stereo multiplex signals including a predetermined pilot signal; indicating means yielding a visual indication of the presence of said predetermined pilot signal, said predetermined pilot signal being a continuous wave of particular frequency, said signal translation means also being subject to spurious short duration signals of said particular frequency; means, responsive to said particular frequency, segregating said predetermined pilot signal; said indicating means including a transistor having an input circuit coupled to said means segregating said predetermined pilot signal and an output circuit including an indicating lamp having a predetermined thermal delay characteristic; and means supplying operating potential to said transistor; said transistor being normally nonconductive and being driven conductive responsive to signals of said particular frequency; the thermal delay characteristic of said indicating lamp allowing said lamp to yield a visual indication of the presence of said predetermined pilot signal and preventing said lamp from yielding a visual indication of the presence of said spurious short duration signals.

2. In combination; signal translation means translating a predetermined signal; indicating means yielding a visual indication of the presence of said predetermined signal, said predetermined signal being a continuous wave of particular frequency; means generating, under control of said predetermined signal, signals harmonically related to said predetermined signal; said last mentioned means being subject to control by spurious short duration signals of said particular frequency; circuit means responsive to signals of said particular frequency and to harmonics of signals of said particular frequency; said indicating means including a transistor having an input circuit coupled to said circuit means and an output circuit including an indicating lamp having a predetermined thermal delay characteristic; and means supplying operating potentials to said transistor, said transistor being normally nonconductive and being driven conductive responsive to signals of said particular frequency and harmonics thereof; the thermal delay characteristic of said indicating lamp enabling said lamp to yield a visual indication of the presence of said predetermined signal and preventing said lamp from yielding a visual indication of the presence of said spurious short duration signals.

3. The combination as set forth in claim 2 wherein said indicating lamp comprises an unbypassed load element in said output circuit of said transistor, the load current through said lamp thereby including a direct current component and components corresponding to said particular frequency and harmonics thereof.

4. In combination in a frequency modulation multiplex detector responsive to multiplex signals including a continuous pilot carrier of predetermined frequency and to fortuitous short duration signals of said predetermined frequency; means, responsive to said predetermined frequency, segregating said pilot carrier; a transistor having an input circuit coupled to said means and a load circuit consisting of an unbypassed incandescent indicator lamp having a predetermined thermal delay characteristic; means supplying operating potentials to said transistor, said transistor being nonconductive in the absence of signals of said predetermined frequency; said input circuit of said transistor energizable responsive to signals of said predetermined frequency for switching said transistor into conduction whereby load current having a direct component and an alternating component of said predetermined frequency flows through said indicator lamp, said predetermined thermal delay characteristic of said indicator lamp allowing said lamp to be lighted responsive to said continuous pilot carrier and preventing said lamp from being lighted by said fortuitous short duration signals at said predetermined frequency.

5. An indicator circuit for a decoder of frequency modulated stereophonic multiplex signals including a continuous pilot carrier of predetermined frequency, said decoder including means segregating said pilot carrier, comprising; a normally nonconductive transistor having a base electrode, an emitter electrode and a collector electrode; means supplying a direct current potential across said collector and said emitter electrodes; means coupling the segregated pilot carrier across said base and said emitter electrodes; and an incandescent indicator lamp having predetermined thermal delay characteristics connected in series with said collector electrode, said transistor, responsive to said continuous pilot carrier, being driven into conduction and overcoming said thermal delay characteristic of said incandescent indicator lamp whereby said incandescent indicator lamp is lighted, the thermal delay characteristic of said incandescent indicator lamp effectively preventing signals of said predetermined frequency but of short duration from causing said indicator lamp to light.

No references cited.